US006993129B1

(12) United States Patent
Barr

(10) Patent No.: US 6,993,129 B1
(45) Date of Patent: Jan. 31, 2006

(54) MIRROR-COMMUNICATION SYSTEM

(76) Inventor: Craig Barr, 2925 Alta Ter., La Crescenta, CA (US) 91214

( * ) Notice: Subject to any disclaimer, the term of this patent is extended or adjusted under 35 U.S.C. 154(b) by 611 days.

(21) Appl. No.: 10/097,768

(22) Filed: Mar. 14, 2002

(51) Int. Cl.
*H04M 1/00* (2006.01)
(52) U.S. Cl. .................. 379/435; 379/428.03
(58) Field of Classification Search ............. 379/435, 379/436, 428.01, 428.03; 361/686; 345/168; 715/505
See application file for complete search history.

(56) References Cited

U.S. PATENT DOCUMENTS

| 6,044,382 | A | * | 3/2000 | Martino ..................... 715/505 |
| 6,046,730 | A | * | 4/2000 | Bowen et al. ............. 345/168 |
| 6,590,767 | B2 | * | 7/2003 | Liao et al. ................. 361/686 |
| 6,757,165 | B2 | * | 6/2004 | Fujiki et al. .............. 361/686 |

* cited by examiner

*Primary Examiner*—Jack Chiang

(57) ABSTRACT

A communication system comprises an electronic assembly. The electronic assembly includes a random access digital visual and audible data storage and playback device, a visual display and an audio amplifier coupled to the data storage and playback device, a local display speaker coupled to the audio amplifier, a programable logic device coupled to the data storage and playback device and adapted to select and play the appropriate visual and audible data, based upon the status of a plurality of outside world devices coupled to the logic device. Also provided is a housing assembly. The housing assembly includes an enclosure. The enclosure receives the visual display and the local display speaker. The housing assembly also includes a two-way mirror/one-way glass. The glass has a semi-reflective surface mounted in the enclosure. In this manner the semi-reflective surface faces exteriorly away from the visual display. In this manner the semi-reflective surface conceals the visual display until it produces light.

19 Claims, 10 Drawing Sheets

MIRROR-COMMUNICATION SYSTEM

BACKGROUND OF THE INVENTION

1. Field of the Invention

The present invention relates to a mirror-communication system and more particularly pertains to generating audio and visual content in response to a variety of input signals including but not limited to home automation/security system.

2. Description of the Prior Art

The use of communication systems of known designs and configurations is known in the prior art. More specifically, communication systems of known designs and configurations previously devised and utilized for the purpose of producing output through various methods and apparatuses are known to consist basically of familiar, expected, and obvious structural configurations, notwithstanding the myriad of designs encompassed by the crowded prior art which has been developed for the fulfillment of countless objectives and requirements.

Although not confirmed, this inventor was made aware through word of mouth that visual displays hidden behind partially reflective mirror have been utilized by some amusement parks, casino and the like as "Magic Mirror" special effect display gags. These special effects display gags typically were triggered to start when the intended viewer tripped a localized start sensor. The amusement related content segment would play to the end of the segment and stop until another intended viewer tripped the sensor again. Another reported mode was when a special effects display was part of an amusement park ride show where the control systems would start the display content when the group approached in a ride vehicle.

In all known examples the content is directed to the individual tripping the sensor or riding in the ride vehicle and the content was purely amusement oriented and rarely changed or updaed once installed. These devices were special effects display amusement devices.

None of these systems where:

1. Designed and configured to display large amounts of different messages synchronized by the status of many different sensors, as found for example a home automation/security system.

2. Configured where the content can be remotely modified or updated for purposed of marketing and selling products and services, these improvements therefore completely change the prior art from a "magic mirror" special effects display gag to a powerful true communication system that gives the user numbers of useful messages about their environment and or available products and services.

While these devices fulfill their respective, particular objectives and requirements, they do not describe a mirror-communication system that allows the generating of entertaining useful information to a user in the form of audio and visual output in response to a variety of input signals.

In this respect, the mirror-communication system according to the present invention substantially departs from the conventional concepts and designs of the prior art, and in doing so provides an apparatus primarily developed for the purpose of generating entertaining useful information to a user in the form of audio and visual output in response to a variety of input signals.

Therefore, it can be appreciated that there exists a continuing need for a new and improved mirror-communication system which can be used for generating audio and visual output in response to a variety of input signals. In this regard, the present invention substantially fulfills this need.

SUMMARY OF THE INVENTION

In view of the foregoing disadvantages inherent in the known types of communication systems of known designs and configurations now present in the prior art, the present invention provides an improved mirror-communication system. As such, the general purpose of the present invention, which will be described subsequently in greater detail, is to provide an alternate way for a system to communicate with a user and or patron which has all the advantages of the prior art and none of the disadvantages.

To attain this, the present invention essentially comprises the use of a visual display disguised as a decorative or functional mirror as a communications device which includes an electronic assembly. The electronic assembly includes a random access digital visual and audible data storage and playback device. The device is adapted to store prerecorded randomly accessible visual and audible data. The device is further adapted to provide outputs which are configurable as required to drive the appropriate visual display and audio amplifiers. The electronic assembly also includes a visual display. The visual display is coupled to the data storage and playback device for the receipt of data. The visual display further has a plurality of heat exchangers to dissipate produced heat. Also included in the electronic assembly is an audio amplifier. The audio amplifier is coupled to the data storage and playback device for the receipt of data. A local display speaker is included in the electronic assembly. The local display speaker is coupled to the audio amplifier for the receipt of data. The electronic assembly also includes a facility audio system output. The facility audio system output is coupled to the data storage and playback device for the receipt of data. A facility visual system output is further included in the electronic assembly. The facility visual system output is coupled to the data storage and playback device for the receipt of data. A programmable logic device is further included in the electronic assembly. The logic device is adapted to perform file management, home automation/security logic, select and play the appropriate visual and audio data in response to the logic program and input from devices located in the outside world. These devices include, but are not limited to, switches, sensors, thermostats, relays, and the like. These devices are coupled to the logic device. Further serial, parallel, network and modem ports are provided as required for interfacing with external devices. Files, control logic, visual and audible data can be updated and changed via network and internet connections.

All of the couplings of the electronic assembly are by any conventional electrical coupling selected from the class of electrical couplings. The class of electrical couplings includes parallel, series, hardwired, infrared, and radio frequency. The couplings of the electronic assembly enable the system to provide signaling to a remote source from the class of remote sources. The class of remote sources includes, but is not limited to, phones, pagers, PDAs, email, computer networks or monitoring services with the status of a local outside world devices. Provided next is a housing assembly. The housing assembly is in the form of a decorative electronic support and display. The decorative electronic support and display includes a large enclosure. The large enclosure receives the visual display and components of the electronic assembly. The large enclosure is formed in a generally rectilinear configuration. The rectilinear configuration includes first parallel vertical sidewalls and first parallel horizontal top and bottom walls there between and a back plate. The back plate has an open front. The first parallel horizontal top and bottom walls have a plurality of thin rectangular apertures. The apertures allow for the circulation of air in and out of the enclosure. The decorative electronic support and display also includes a small enclosure. The small enclosure receives the local display speaker. The small enclosure is formed in a generally rectilinear configuration. The rectilinear configuration includes second parallel vertical sidewalls and a second horizontal top wall. The second bottom wall is formed from the first horizontal top wall of the enclosure assembly. A second back plate is continuous with the first. Also included in the decorative electronic support and display is an external decorative frame. The frame is of a generally rectilinear configuration. The frame is adapted to cover both the large enclosure and the small enclosure. The frame has an apex aperture with a sound permeable diaphragm therein. The apex aperture is adjacent to the small enclosure. The frame also has a central rectangular aperture. Further included in the decorative electronic support and display is a two-way mirror/one-way glass. The glass has a semi-reflective surface mounted in the aperture. In this manner the semi-reflective surface conceals the visual display until it produces light. The decorative frame has two vertical side edges positionable over the open front of the large and small enclosures. The decorative frame has a hinge with a vertical axis pivotably coupling one vertical side edge of the decorative frame with one sidewall of the large enclosure. A latching assembly is located on the other sidewall of the enclosure assembly and the other side edge of the large enclosure. Lastly included in the decorative electronic support and display is a bezel. The bezel is adapted to encapsulate the large enclosure and small enclosure to facilitate the mounting of the system. The bezel has an peripheral surface, an internal edge and an external edge.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mirror-communication system which has all of the advantages of the prior art communication systems of known designs and configurations and none of the disadvantages.

It is another object of the present invention to provide a new and improved mirror-communication system which may be easily and efficiently manufactured and marketed.

It is further an object of the present invention to provide a new and improved mirror-communication system which is of durable and reliable constructions.

An even further object of the present invention is to provide a new and improved mirror-communication system which is susceptible of a low cost of manufacture with regard to both materials and labor, and which accordingly is then susceptible of low prices of sale to the consuming public, thereby making such mirror-communication system economically available to the buying public.

Even still another object of the present invention is to provide a mirror-communication system for generating audio and visual content in response to a variety of input signals.

Lastly, it is an object of the present invention to provide a new and improved communication system comprising an electronic assembly. The electronic assembly includes a random access digital visual and audible data storage and playback device, a visual display and an audio amplifier coupled to the data storage and playback device, a local display speaker coupled to the audio amplifier, a logic device coupled to the data storage and playback device and adapted to select and play the appropriate visual and audio data, and a plurality of outside world devices coupled to the logic device. Also provided is a housing assembly. The housing assembly includes an enclosure. The enclosure receives the visual display and the local display speaker. The housing assembly also includes a two-way mirror/one-way glass. The glass has a semi-reflective surface mounted in the enclosure. In this manner the semi-reflective surface conceals the visual display until it produces light.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
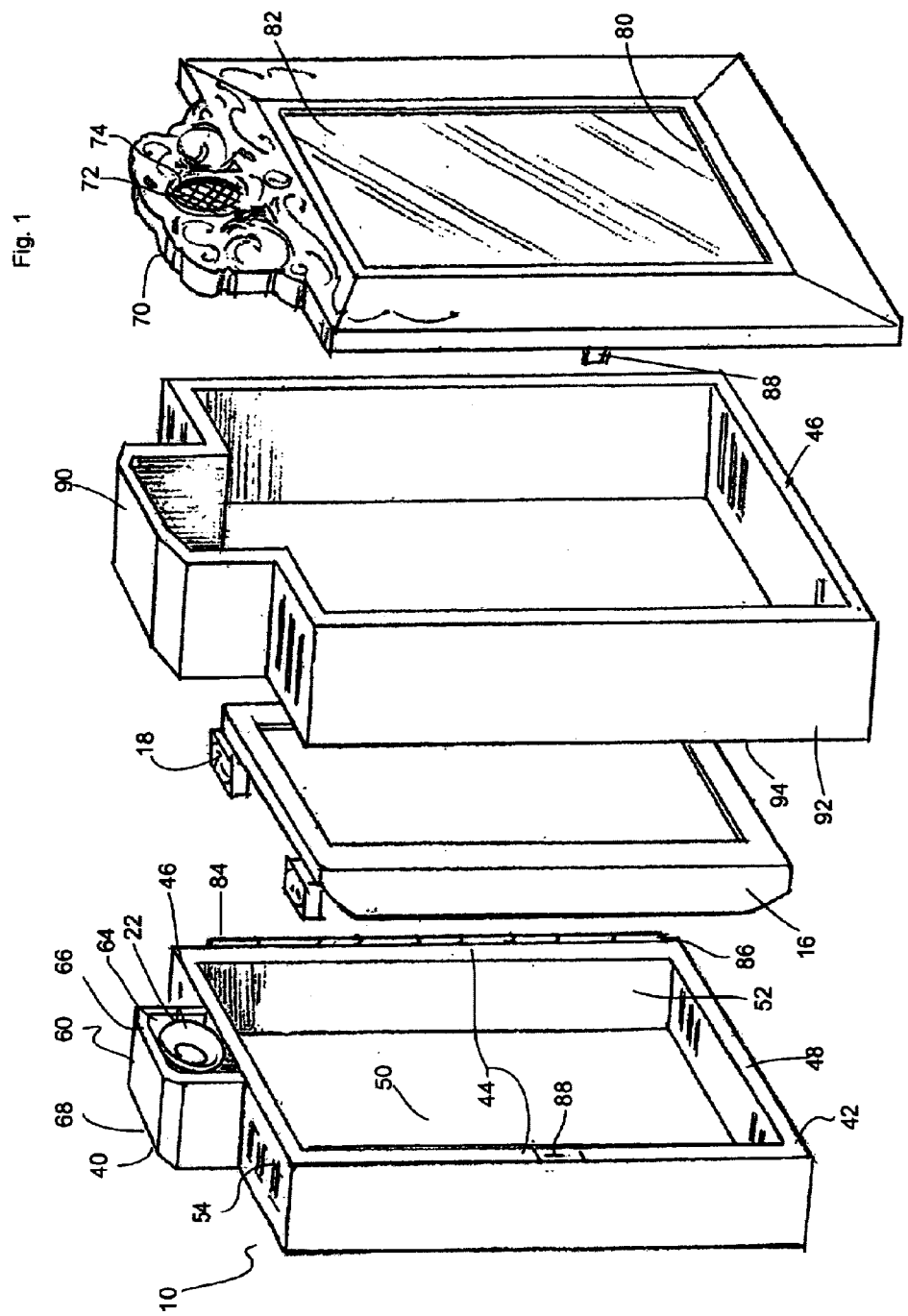
FIG. 1 is an exploded perspective illustration of the present invention in accordance with the principles set forth herein.

With reference now to the drawings, and in particular to FIG. 1 thereof, the preferred embodiment of the new and improved mirror-communication system embodying the principles and concepts of the present invention and generally designated by the reference numeral 10 will be described.

The present invention, the mirror-communication system 10 is comprised of a plurality of components. Such components in their broadest context include an electronic assembly and a housing assembly. Such components are individually configured and correlated with respect to each other so as to attain the desired objective.

First provided is an electronic assembly 12. The electronic assembly includes a random access digital visual and audible data storage and playback device 14. The device is adapted to store prerecorded randomly accessible visual and audible data. The device is further adapted to provide outputs which are configurable as required to drive the appropriate visual display and audio amplifiers. Visual and audible data can be updated and changed via network and Internet connections.

The electronic assembly also includes a visual display 16. The visual display is coupled to the data storage and playback device for the receipt of data. The visual display further has a plurality of heat exchangers 18 to dissipate produced heat. Also included in the electronic assembly is an audio amplifier 20. The audio amplifier is coupled to the data storage and playback device for the receipt of data.

A local display speaker 22 is included in the electronic assembly. The local display speaker is coupled to the audio amplifier for the receipt of data.

The electronic assembly also includes a facility audio system input 24. The facility audio system output is coupled to the data storage and playback device for the receipt of data.

A facility visual system output 26 is further included in the electronic assembly. The facility visual system output is coupled to the data storage and playback device for the receipt of data.

A programable logic device 28 is further included in the electronic assembly. The logic device is adapted to perform file management, home automation/security logic, select and play the appropriate visual and audio data in response to the logic program and input from devices located in the outside world. These devices include, but are not limited to, switches, sensors, thermostats, relays and the like. These devices are coupled to the logic device. Further serial, parallel, network and modem ports are provided as required for interfacing with external devices. Files, control logic, visual and audible data can be updated and changed via network and internet connections.

All of the couplings of the electronic assembly are by any conventional electrical coupling selected from the class of electrical couplings. The class of electrical couplings includes parallel, series, hardwired, infrared, and radio frequency. The couplings of the electronic assembly enable the system to provide signaling to a remote source from the class of remote sources. The class of remote sources includes, but is not limited to, phones, pagers, PDAs, email, computer networks or monitoring services with the status of a local outside world devices.

Provided next is a housing assembly 40. The housing assembly is in the form of a decorative electronic support and display. The decorative electronic support and display includes a large enclosure 42. The large enclosure receives the visual display and components of the electronic assembly. The large enclosure is formed in a generally rectilinear configuration. The rectilinear configuration includes first parallel vertical sidewalls 44 and first parallel horizontal top 46 and bottom walls 48 there between and a back plate 50. The back plate has an open front 52. The first parallel horizontal top and bottom walls have a plurality of thin rectangular apertures 54. The apertures allow for the circulation of air in and out of the enclosure.

The decorative electronic support and display also includes a small enclosure 60. The small enclosure receives the local display speaker 62. The small enclosure is formed in a generally rectilinear configuration. The rectilinear configuration includes second parallel vertical sidewalls 64 and a second horizontal top wall 66. The second bottom wall is formed from the first horizontal top wall of the enclosure assembly. A second back plate 68 is continuous with the first.

Also included in the decorative electronic support and display is an external decorative frame 70. The frame is of a generally rectilinear configuration. The frame is adapted to cover both the large enclosure and the small enclosure. The frame has an apex aperture 72 with a sound permeable diaphragm 74 therein. The apex aperture is adjacent to the small enclosure. The frame also has a central rectangular aperture.

Further included in the decorative electronic support and display is a two-way mirror/one-way glass 80. The glass has a semi-reflective surface mounted 82 in the aperture. In this manner the semi-reflective surface faces exteriorly away from the visual display. The decorative frame has two vertical side edges positionable over the open front of the large and small enclosures. The decorative frame has a hinge 84 with a vertical axis 86 pivotably coupling one vertical side edge of the decorative frame with one sidewall of the large enclosure. A latching assembly 88 is located on the other sidewall of the enclosure assembly and the other side edge of the large enclosure.

Lastly included in the decorative electronic support and display is a bezel 90. The bezel is adapted to encapsulate the large enclosure and small enclosure to facilitate the mounting of the system. The bezel has an peripheral surface 92, an internal edge 94 and an external edge 96.

Figure 2:
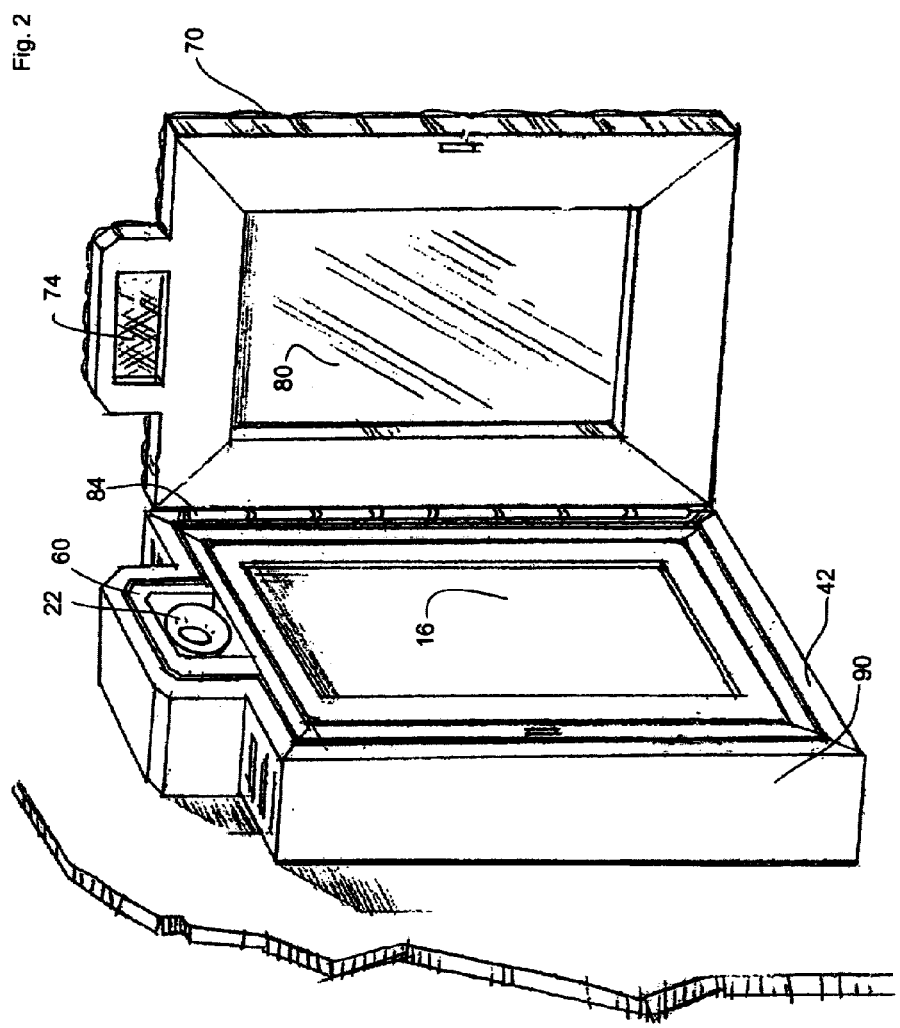
FIG. 2 is a perspective illustration of an alternative embodiment of the present invention wherein the bezel and the housing assembly is surface mounted to a wall.

In an alternate embodiment of the invention as shown in FIG. 2 wherein the bezel 90 and the housing assembly is surface mounted to a wall. The backplate of the housing is flush with a wall and coupled using a retaining means from the class of retaining means including but not limited to adhesives, brackets or hooks.

Figure 3:
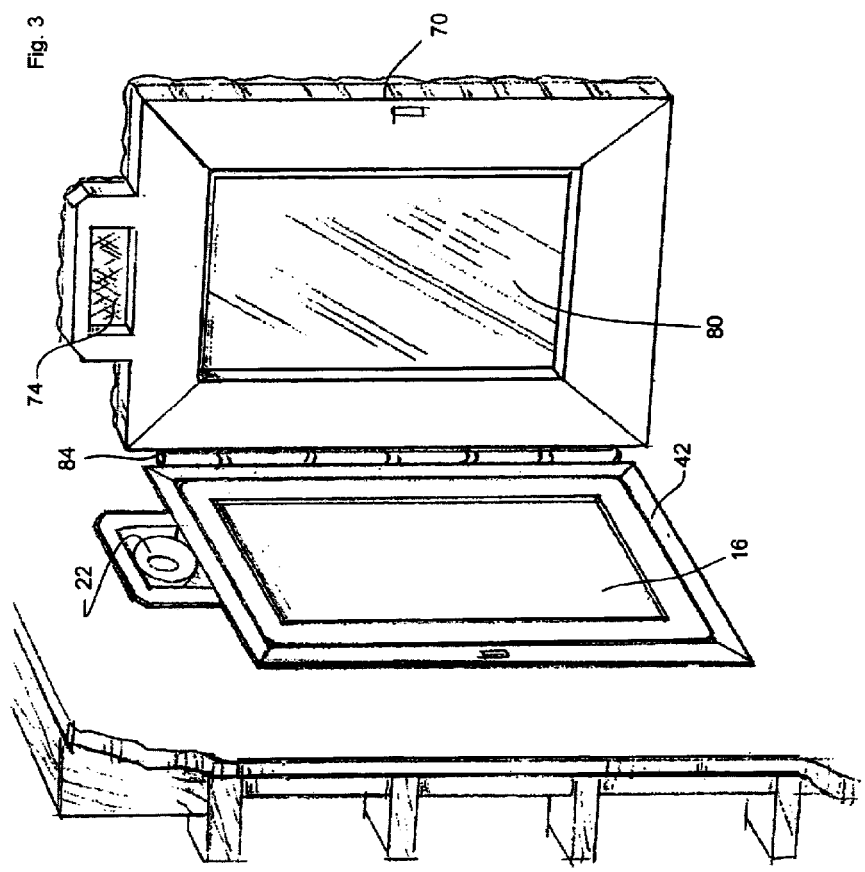
FIG. 3 is an perspective illustration of an alternative embodiment of the present invention wherein the enclosure of the housing assembly are coupled within a wall with only decorative frame in the field of view.

In an alternate embodiment of the invention shown in FIG. 3 the enclosure of the housing assembly are coupled within a wall with only decorative frame in the field of view. In such an embodiment the enclosure is coupled to the internal structures of the wall, such that the enclosure is hidden form view.

Figure 4:
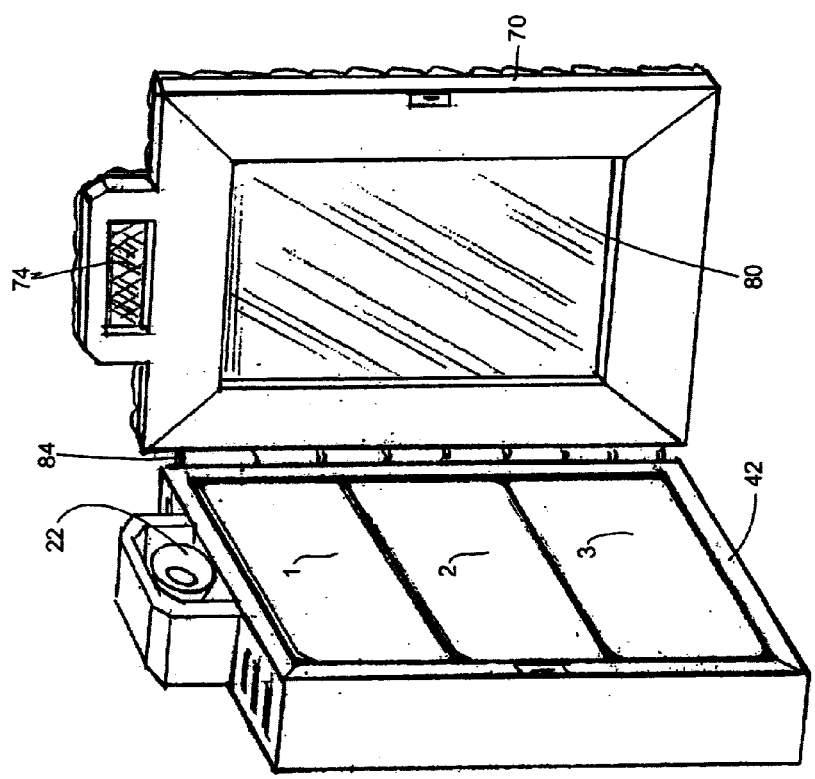
FIG. 4 is an perspective illustration of an alternative embodiment of the present invention wherein the housing assembly is adapted to hold a plurality of visual displays.
Figure 5:
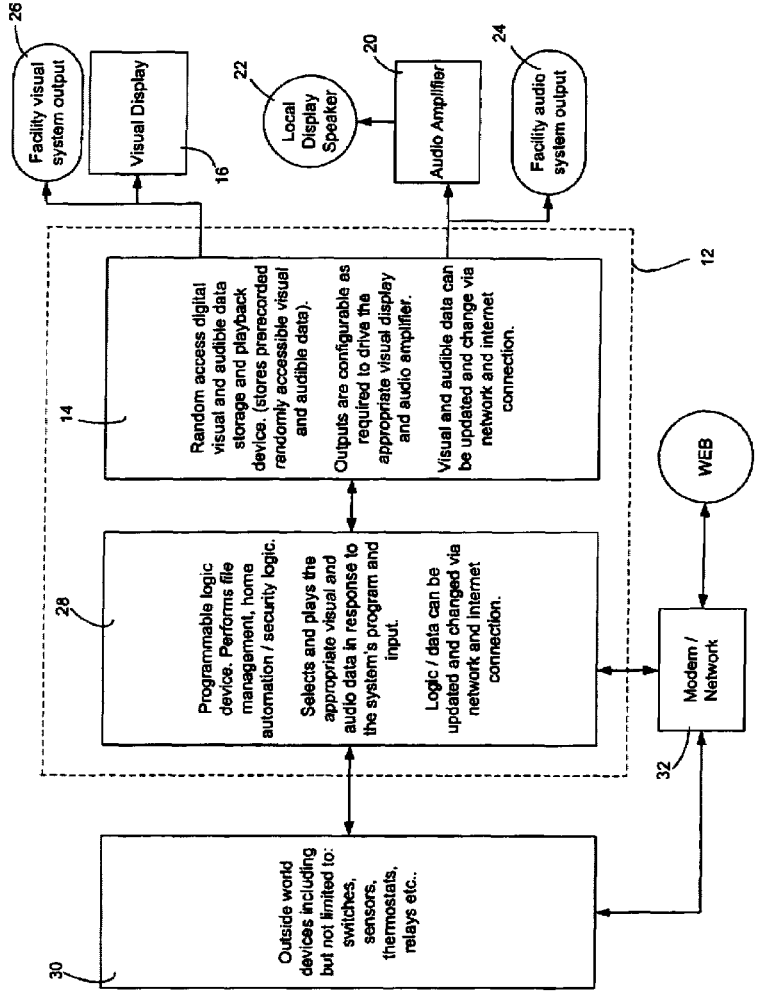
FIG. 5 is a schematic illustration of the electronic assembly associated with the present invention in accordance with the principles set forth herein.

In an alternate embodiment as shown in FIG. 4 is wherein the housing assembly is adapted to hold a plurality of visual displays. Such visual displays may be arranged in various design and configurations to obtain the desired output. Such visual displays being adapted to couple with various input devices.

Figure 6:
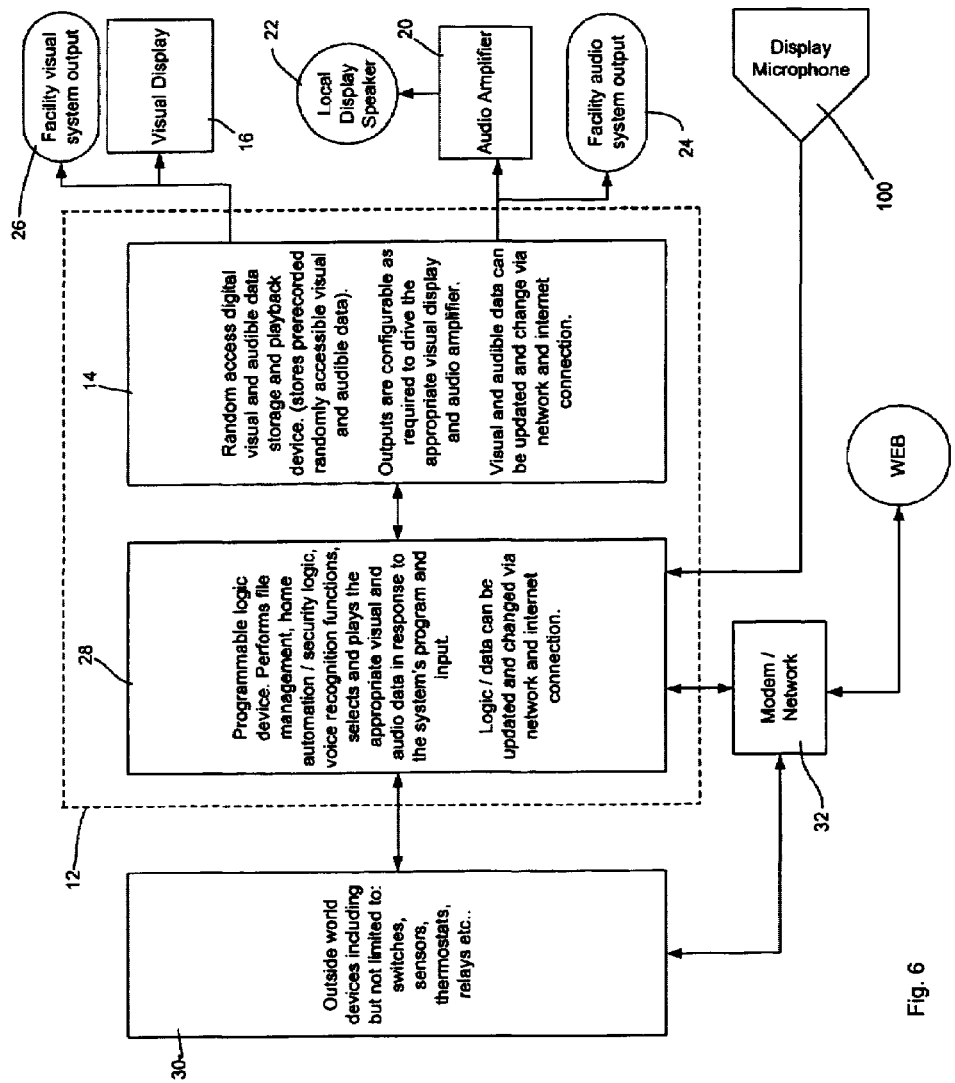
FIG. 6 is a schematic illustration of an alternative embodiment of the electronic assembly wherein a microphone is added to provide two communication between the system and the user.

In an alternate embodiment of the invention shown in FIG. 6 wherein the schematic illustration shows the electronic assembly wherein a microphone is added to provide two communication between the system and the user. This provides a means of hands-free communication between the user and the system.

Figure 7:
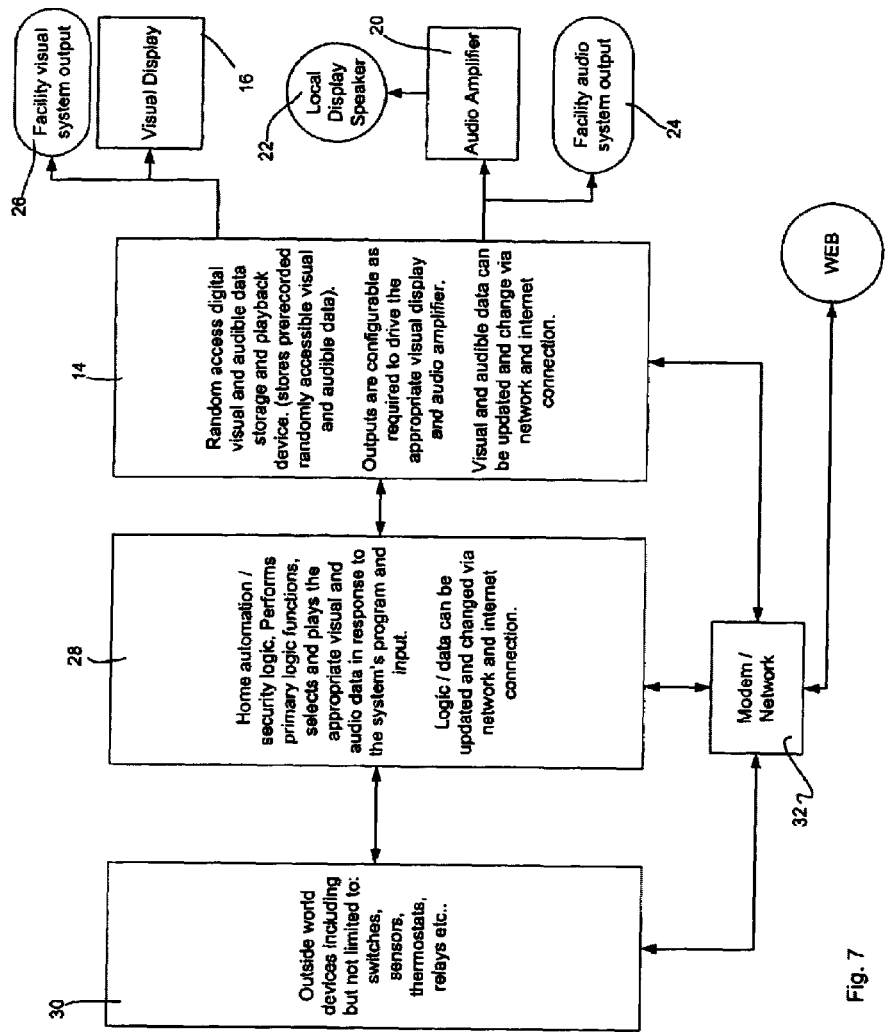
FIG. 7 is a schematic illustration of an alternative embodiment of the electronic assembly wherein the storage and play back device is housed separately from the home automation/security logic.

In an alternate embodiment of the invention shown in FIG. 7 the schematic illustration shows the electronic assembly with the random access digital visual and audible data storage and playback device incorporating software adapted to access and synchronize stores of prerecorded visual and audible data such that inputted audible data and/or text data can be converted to an output to simulate the input data. This provides increased variability of the output.

Figure 8:
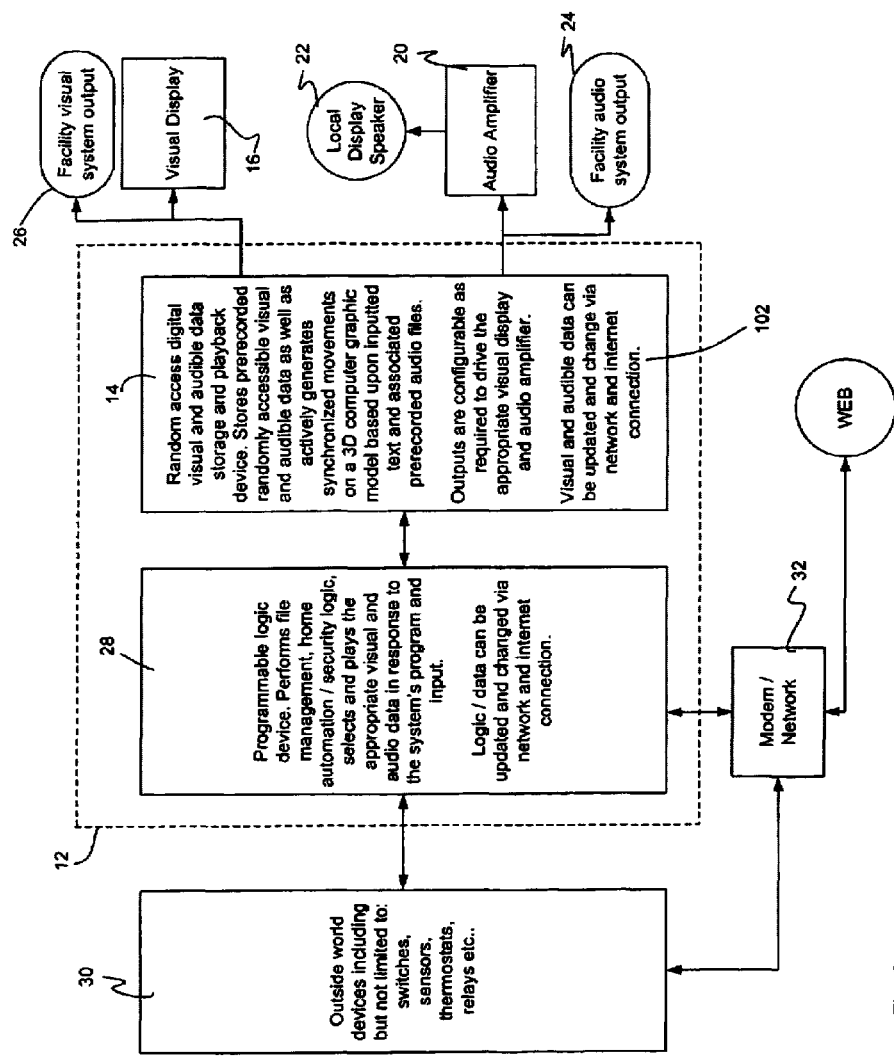
FIG. 8 is a schematic illustration of an alternative embodiment of the electronic assembly wherein the random access digital visual and audible data storage and playback device incorporates software adapted to access and synchronize stores of prerecorded visual and audible data such that inputted audible data and/or text data can be converted to an output to simulate the input data.
Figure 9:
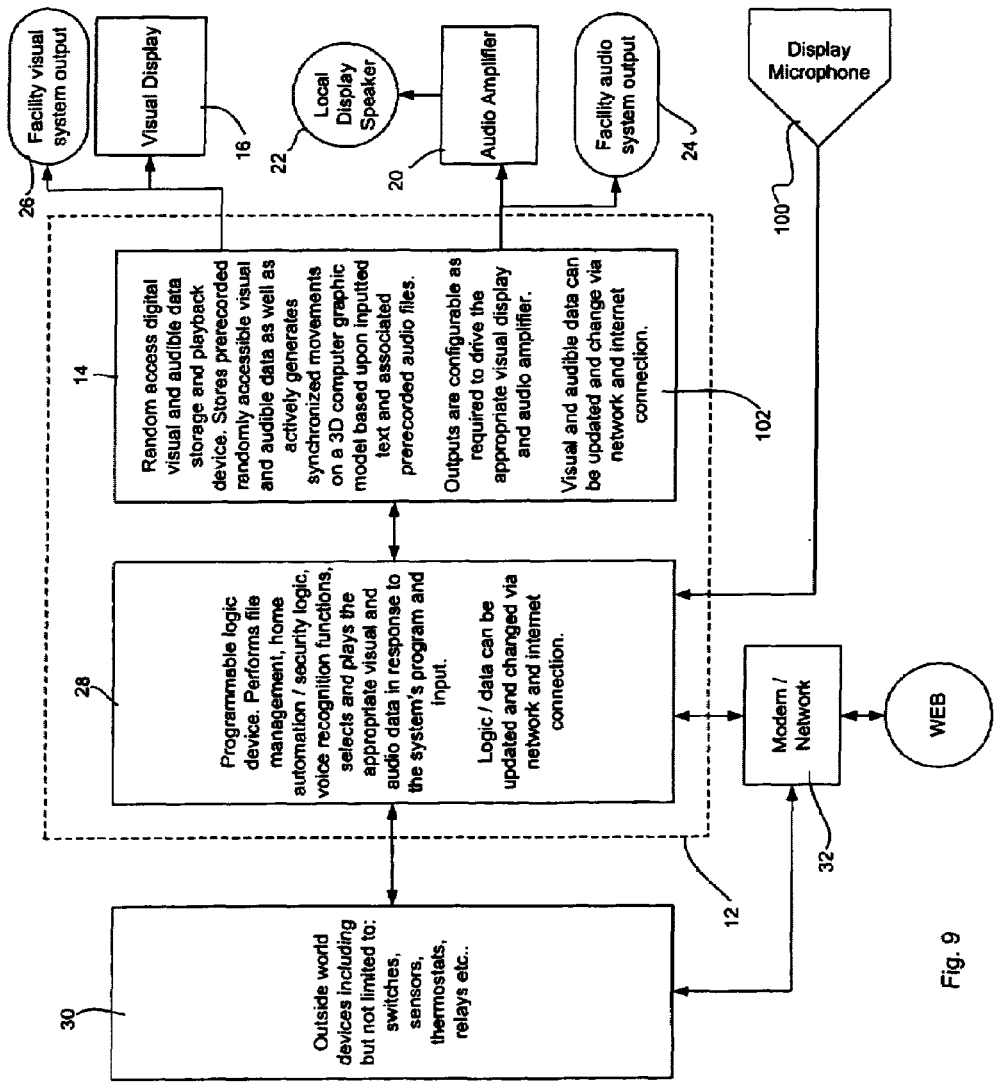
FIG. 9 is a schematic illustration of an alternative embodiment of the electronic assembly wherein the random access digital visual and audible data storage and playback device incorporates both a microphone for two way communication and synchronizing software.
Figure 10:
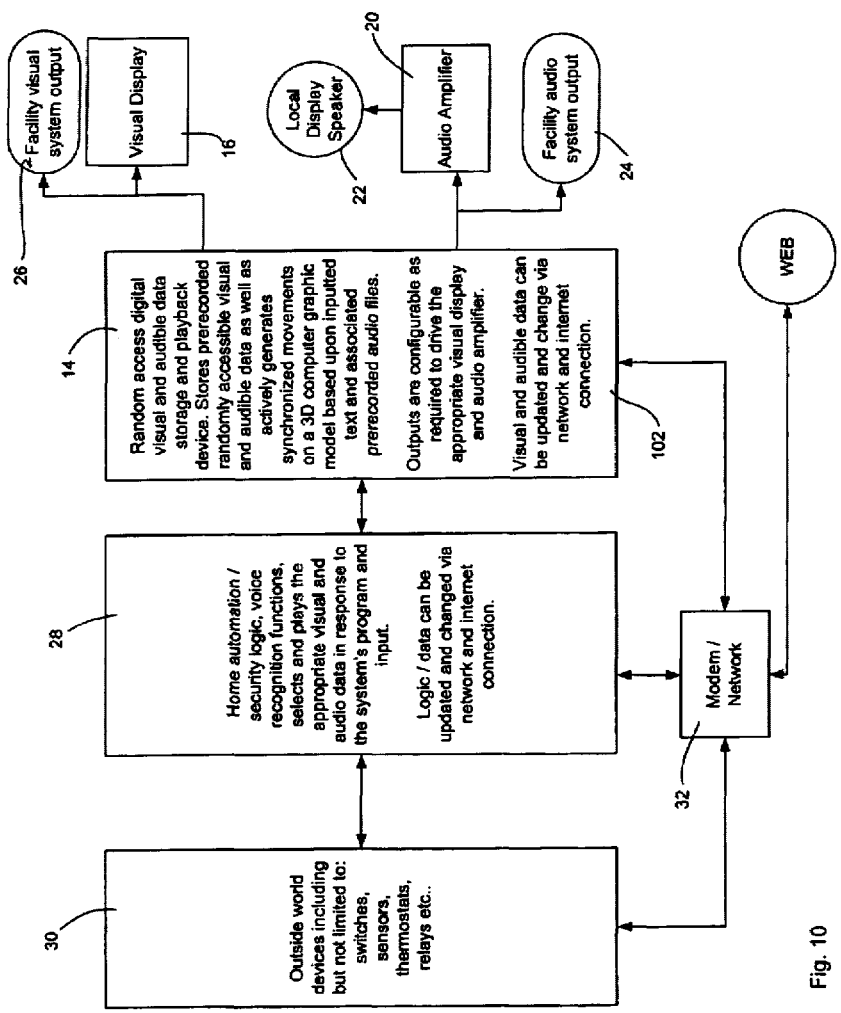
FIG. 10 is a schematic illustration of an alternative embodiment of the electronic assembly wherein the random access digital visual and audible data storage and playback device incorporates synchronizing software and is housed separately from the home automation and security system.

In a final alternative embodiment shown in FIG. 8 the schematic illustration shows the electronic assembly wherein the random access digital visual and audible data storage and playback device incorporates both a microphone for two way communication and synchronizing software.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A disguised mirror-communication system for generating audio/visual output in response to input signals, said disguised mirror communication system in a first mode being disguised as a conventional decorative mirror providing to a user only a reflection, and in a second mode said disguised mirror communication system also providing audio/visual output to a user, said disguised mirror communication system comprising, in combination:

a programmable logic device adapted to perform all of file management, home automation/security program logic, random access digital audio/visual data storage, and playback functions;

said programmable logic device further being adapted to store prerecorded randomly accessible audio/visual data, and adapted to provide outputs which are configurable as required to drive appropriate visual display and audio amplifiers; and wherein the programmable logic device plays the appropriate audio/visual data in response to the home automation/security logic program; and wherein said programmable logic device is further configured to receive input from devices on a network as well as from devices in the outside world and wherein files, control logic, and audio/visual data can be updated and changed via network and internet connections;

a light-producing video display coupled to the data storage and playback device for the receipt of video data;

an audio amplifier coupled to the data storage and playback device for the receipt of audio data;

a local display speaker coupled to the audio amplifier for the receipt of audio data;

a facility audio system output coupled to the data storage and playback device for the receipt of audio data;

a facility visual system output coupled to the data storage and playback device for the receipt of video data;

a plurality of devices responsive to circumstances and events in the outside world, said devices including elements drawn from the group including: switches, sensors, thermostats, relays, coupled to the programmable logic device for the transmission of data indicative of outside world events and circumstances into the logic device;

a housing assembly including: an enclosure receiving the visual display and components of the electronic assembly;

an external decorative frame adapted to cover the enclosure, the frame having a central aperture;

a two-way mirror with a semi-reflective surface mounted in the aperture such that the semi-reflective surface provides a reflection to a user and effectively conceals the visual display, and in said second mode said visual display producing said visual data in the form of light transmitting through said semi-reflective surface to said user.

2. A disguised mirror communication system in a first mode being disguised as a conventional decorative mirror and providing a reflection to a user, and in a second mode said mirror communication system providing also audio/video data to said user, said mirror communication system comprising:

an electronic assembly including a random access digital audio/visual data storage and playback device; a visual display and an audio amplifier coupled to the data storage and playback device; a local display speaker coupled to the audio amplifier; a logic device coupled to the data storage and playback device and adapted to select and play the appropriate visual and audio data; and a plurality of outside world devices coupled to the logic device; and a housing assembly including an enclosure receiving the visual display and the local display speaker; and a two-way mirror with a semi-reflective surface mounted in the enclosure such that the semi-reflective surface in a first mode provides a reflection to a user and effectively conceals the visual display, and in a second mode, said visual display producing light which is transmitted though said semi-reflective surface to provide video data to the user.

3. The system as set forth in claim 2 wherein the outside world sensors are connected to an external logic control device that signals the electronic assembly to play the appropriate audible and visual data.

4. The system as set forth in claim 2 wherein the electronic assembly includes a facility audio system input coupled to the data storage and playback device.

5. The system as set forth in claim 2 wherein the electronic assembly includes a facility visual system input coupled to the data storage and playback device.

6. The system as set forth in claim 2 wherein the electrical assembly is coupled to a display microphone to allow audio interaction between the user and the system.

7. The system as set forth in claim 2 wherein the random access digital visual and audible data storage and playback device incorporates additional software adapted to access and synchronize, three dimensional computer graphic visual models by way of inputting audible data and/or text data.

8. The system as set forth in claim 7 wherein the electrical assembly is coupled to a display microphone to allow audio interaction between the user and the system.

9. The system as set forth in claim 2 wherein the housing assembly includes a hinge with a vertical axis pivotably coupling one vertical side edge the decorative frame with one sidewall of the large enclosure with a latching assembly located on the other sidewall of the enclosure assembly.

10. The system as set forth in claim 2 wherein the housing assembly includes a plurality of thin rectangular apertures to allow the circulation of air in and out of the enclosures.

11. The system as set forth in claim 2 wherein the housing assembly includes a bezel adapted to encapsulate the large enclosure and small enclosure to facilitate the mounting of the system to a surface and having an peripheral surface, an internal edge and an external edge.

12. The system as set forth in claim 11 wherein the bezel is adapted to be coupled to a wall such that the internal edge of the bezel is flush with the wall.

13. The system as set forth in claim 2 wherein the housing assembly is adapted to be coupled within a wall such that the enclosure is adapted to couple in the internal structural components of the wall.

14. The system as set forth in claim 2 wherein the housing assembly being adapted to hold a plurality of visual displays.

15. The system as set forth in claim 7 wherein the outside world sensors are connected to an external logic control device that signals the electronic assembly to play the appropriate audible and visual data.

16. A method of providing a disguised mirror communication system which in a first mode is disguised as a conventional decorative mirror providing a reflection to a user, and which in a second mode provides also audio/video data to said user, said method comprising steps of:

providing an electronic assembly including a random access digital audio/visual data storage and playback device; a light-producing visual display and an audio amplifier coupled to the data storage and playback device; a local display speaker coupled to the audio amplifier; a logic device coupled to the data storage and playback device and adapted to select and play the appropriate visual and audio data; and a plurality of outside world devices coupled to the logic device; and providing a housing assembly including an enclosure receiving the visual display and the local display speaker;

concealing said visual display behind a two-way mirror with a semi-reflective surface mounted in the enclosure such that the semi-reflective surface in a first mode provides a reflection to a user and effectively conceals the visual display, and in a second mode for said mirror communication system said visual display producing light which is transmitted though said semi-reflective surface to provide video data to the user.

17. The method of claim 16 further including the steps of: providing the housing assembly with a bezel adapted to encapsulate the electronic assembly and providing for mounting of the system to a surface.

18. The method of claim 16 further including the steps of: configuring the housing assembly to be received and supported within a wall.

19. The method of claim 16 further including the step of: configuring said housing assembly to hold a plurality of visual displays each positioned to be viewed through said two-way mirror when a particular visual display is producing light.

* * * * *